United States Patent
Oord et al.

(10) Patent No.: US 12,319,509 B2
(45) Date of Patent: Jun. 3, 2025

(54) ATTACHMENT PIECE, ROD ASSEMBLY AND ROD BAND

(71) Applicant: ARNOLD JÄGER HOLDING GMBH, Hannover (DE)

(72) Inventors: Johan Oord, Groningen (NL); Sebastian Jäger, Hannover (DE); Johan E. Adrichem, Uitgeest (NL)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 140 days.

(21) Appl. No.: 18/131,529

(22) Filed: Apr. 6, 2023

(65) Prior Publication Data
US 2024/0336440 A1      Oct. 10, 2024

(51) Int. Cl.
  *B65G 17/06* (2006.01)
  *A01D 17/10* (2006.01)
  *B65G 17/42* (2006.01)
  *F16G 3/08* (2006.01)

(52) U.S. Cl.
  CPC ......... *B65G 17/063* (2013.01); *A01D 17/10* (2013.01); *B65G 17/42* (2013.01); *F16G 3/08* (2013.01); *A01D 2017/103* (2013.01)

(58) Field of Classification Search
  None
  See application file for complete search history.

(56) References Cited

U.S. PATENT DOCUMENTS

| | | | | |
|---|---|---|---|---|
| 1,552,319 A | * | 9/1925 | Latendorf | B65G 15/52 198/793 |
| 4,023,671 A | * | 5/1977 | Kramer | F16G 3/08 24/31 B |
| 4,633,956 A | * | 1/1987 | Glifberg | B65G 15/52 171/25 |
| 4,724,909 A | * | 2/1988 | Link | A01D 17/10 171/126 |
| 4,815,587 A | * | 3/1989 | Musil | F16G 3/02 198/844.2 |
| 4,892,509 A | * | 1/1990 | Jager | A01D 17/10 474/237 |
| 5,099,548 A | * | 3/1992 | Loosli | F16G 3/02 198/844.2 |
| 5,176,248 A | * | 1/1993 | Allen | A01D 17/10 171/126 |

(Continued)

FOREIGN PATENT DOCUMENTS

| | | |
|---|---|---|
| DE | 945874 C | 7/1956 |
| DE | 2715108 A1 | 10/1978 |

(Continued)

OTHER PUBLICATIONS

European Search Report for Counterpart European Patent App. No. EP24168243 dated Aug. 1, 2024, 735-122 EP ǁ 2 pages.

*Primary Examiner* — Kavel Singh
(74) *Attorney, Agent, or Firm* — Barnes & Thornburg LLP

(57) ABSTRACT

A fastener for a rod belt having one or more rods includes a support area, at least one intermediate area, and a fastening area. The support area extends in a longitudinal direction and includes a support side. The at least one intermediate area and the support area are made as one piece. The fastening area projects away from the intermediate area in the longitudinal direction.

14 Claims, 8 Drawing Sheets

(56) References Cited

U.S. PATENT DOCUMENTS

Figure 1:
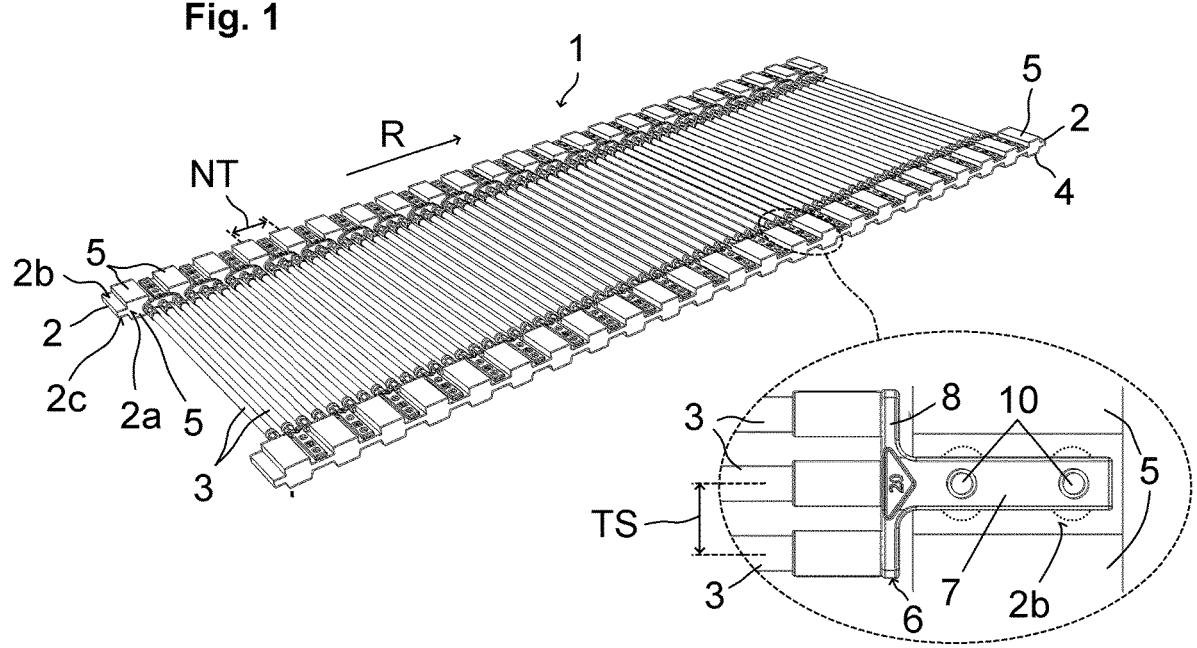

| | | | | |
|---|---|---|---|---|
| 5,738,223 | A * | 4/1998 | Rohrs | B65G 15/52 |
| | | | | 198/848 |
| 7,308,786 | B2 * | 12/2007 | Mulder | A01D 17/10 |
| | | | | 198/848 |
| 9,033,138 | B2 * | 5/2015 | Mulder | B65G 15/52 |
| | | | | 198/848 |
| 9,033,139 | B2 * | 5/2015 | Jager | B65G 17/42 |
| | | | | 198/850 |
| 10,414,592 | B2 * | 9/2019 | Van Wolde | B65G 15/52 |
| 10,850,924 | B1 * | 12/2020 | Jäger | B65G 17/42 |
| 11,155,415 | B1 * | 10/2021 | Jäger | F16G 3/08 |
| 11,167,315 | B2 * | 11/2021 | Schroeder | B07B 1/4636 |
| 11,266,066 | B2 * | 3/2022 | Hugenberg | F16G 3/04 |
| 12,048,266 | B2 * | 7/2024 | Ross | B65G 15/52 |

FOREIGN PATENT DOCUMENTS

| | | |
|---|---|---|
| DE | 3309329 C1 | 4/1984 |
| DE | 8415524 U1 | 8/1984 |
| DE | 3737066 A1 | 6/1989 |
| DE | 19520927 A1 | 12/1996 |
| DE | 20011436 U1 | 10/2000 |
| DE | 202007015687 U1 | 2/2008 |
| EP | 0664074 A1 | 7/1995 |
| EP | 2813135 B1 | 5/2018 |
| WO | 9523497 A1 | 9/1995 |

* cited by examiner

ATTACHMENT PIECE, ROD ASSEMBLY AND ROD BAND

The invention relates to a fastener according to the preamble of claim 1, a rod arrangement, and a rod belt.

Rod belts for rod belt conveyors of agricultural machines are constructed, for example, as disclosed in the document DE 195 20 927 A1. Rod belts of this type comprise two or more pull-resistant elastic and continuous (endless) belts running parallel to one another which are interconnected via a plurality of rods that are arranged perpendicular to the direction of movement of the rod belt and parallel to one another. For affixing the rods on the belt, the rods comprise flattened and perforated support areas by means of which they lie in contact with the belts. The connection of the support areas with the belts is made by rivets or similar fastening means permeating the support area and the belts.

Further rod belts for agricultural machines have been disclosed in the documents DE 27 15 108 A1, WO 95/23497 A1, DE 20 2007 015687 U1 and DE 37 37 066 A1. Further, in DE 200 11 436 U1 or EP 2 813 135 B1, rod belts have been described, wherein the rods are not directly connected at their ends to the belts but, rather, each via an end piece forged from round steel with sleeves or sockets welded onto these or, respectively, a fastener designed as a stamped bended part. The fasteners comprise a flattened and perforated support area which transitions into an intermediate area in the shape of a cranked section extending upwards from the upper side of the belt or, respectively, an elbow angled downwards. In the citation DE 200 11 436 U1 a fixing area for receiving the rod ends in the shape of a sleeve is attached to the cranked section, while in EP 2 813 135 B1 it is the angled piece directly that serves as fixation, whereby the rods are inserted into it through holes in the angled piece. The support areas of the fasteners lie in contact with the upper side of the belts and are affixed thereto by means of rivets. The rods are made of plastics and are affixed to the respective fixation area by clamping or riveting.

Hereby, it is a disadvantage that the process of making the forged and cranked end segment according to DE 200 11 436 U1 is very complex and some screening surface is lost by the upwards cranking and also there will be no lateral boundary of the screening surface. Moreover, a perpendicular cranking for the round steel forged therein is not possible so that screening surface is lost. In EP 2 813 135 B1 it is also disadvantageous that the transition between the rod and the sheet formed angular piece is not very stable so that the rod cannot be kept securely affixed to the angular piece in the event of higher bending moments in the operation of the rod belt. Thus, in such a sheet shaped element the stability will be lower altogether thereby jeopardizing continued operation. Furthermore, increased temperatures on the belt are directly transferred to the rods.

The document EP 0 664 074 A1 further provides for the rods to lie on top of one another and overlap at their ends in the region of the middle belt, thereby providing a form fit resistant against lateral forces, for example, by means of a complementary shape, for example, convex and concave, or overlapping sections being stepped. A disadvantage hereby is that the processing required at the ends of the rods is complex and, moreover, a direct attachment of the rods to the belts is complex and provides less stability.

Therefore, it is the object of the invention to provide a fastener and a rod arrangement which is simple and affordable to produce while also providing high stability or robustness in the joining. A further object of the invention is to provide a rod belt.

This task is solved by a fastener, a rod arrangement, and a rod belt according to the independent claims. Hereby, preferred further developments are specified in the subclaims n.

Thus, according to the invention, in a fastener for a rod belt for agricultural machines comprising a plurality of rods, at least one intermediate area is provided that is non-circular in cross-section and/or eccentrically fitted onto the support area, and this is manufactured as one piece with a support area in the longitudinal direction (in relation to the fastener). The fastener is connected via the support area to the rod belt, for example, using rivets. Hereby, the support area exhibits a support side lying underneath in the vertical direction, on which the fastener lies in contact with an upper side of the belt. In the support area at least one hole is provided through which the fastening means, e.g., rivets, protrude, which also penetrate the belts. Hereby, the support area may be widened in a transverse direction in the region of the holes. This achieves that the support area is not weakened in the region of the holes resulting in a nearly constant geometrical moment of inertia at least across the support area.

Moreover, the intermediate area is angled downwards in the vertical direction starting from the support area so a lateral surface of the intermediate area, which is facing away from the support area, faces in the longitudinal direction, preferably consistently. This also includes lateral surfaces slightly inclined in relation to the vertical which are essentially oriented in the longitudinal direction.

Starting from this lateral surface of the intermediate area at least one socket extends away in the longitudinal direction, the socket comprising an insertion opening extending over an insertion depth for inserting a rod end of a rod of the rod belt. Owing to the downwards angled design of the preferably flat or level intermediate area, the insertion opening runs in the at least one socket below the support side of the support area. Thus, in the assembled state at the rod belt, the rods are displaced downwards in the direction of the neutral fiber of the belt or even below that.

If the fastener is provided for an outer belt of the rod belt it will have merely one intermediate area, while for an application to a middle or inner belt there may also be an intermediate area with sockets arranged on both sides of the support are so as to allow fixation of the rods via the sockets on both sides of the inner belt. Alternatively, this can be achieved in that fasteners each having only one intermediate area with sockets are stacked with their support areas on top of one another, in a manner twisted about the vertical axis, and these are then jointly affixed onto the inner belt. This, too, leads to sockets for receiving rods being provided on both sides of the inner belt.

Further, according to the invention, a rod arrangement made of a fastener according to the invention and a rod received inside the socket of the fastening area, as well as a rod belt having a plurality of fasteners or, respectively, a plurality of rod belt arrangements.

The invention realizes the advantage that the rods of the rod belt can be flexibly shifted downwards in the direction of the neutral fiber of the belts or below thereof, preferably within a range of +/−2 mm about the neutral fiber. Shifting into the neutral fiber increases, in particular, the overall stability of the rod belt because torsional moments on the rod ends or their riveting respectively are avoided. Moreover, the exact rod pitch and thereby the desired sieving effect is maintained across the entire belt length including, in particular, the deflection points, as well as jamming of plant material or foreign objects is avoided. Also, because the direction of the angular deflection is downwards an optimized screen surface is created between the belts, where the intermediate areas at the fasteners together with the belts can act as lateral boundaries for the transported goods.

This can be further improved by an exactly perpendicular angular deflection of the intermediate area starting from the support area. The, the intermediate area will preferably extend parallel to an outer side of the belt onto which fastener is affixed. A distance between the outer side of the belt and the intermediate may be, for example, a maximum of 10 mm or, preferably, even be zero, i.e., the intermediate area touches the outer side of the belt. This creates a maximum screening surface when the lateral surface of the intermediate area facing away from the outer side of the belt, starting from the support area, also extends consistently perpendicular to the longitudinal direction (of the rods) or, respectively, parallel to the outer side of the belt.

Moreover, by means of a non-circular cross-section of the intermediate area and/or an intermediate area being eccentrically fitted onto the support area, it is possible to optimize the boundary of the screening surface towards the belts, because the intermediate area in the case of a level or flat design will hold together the goods to be sieved in a laterally more optimum manner and this cannot fall through at the sides in-between the belts. Furthermore, the transition to the sockets or the fixation thereof can be made simpler and more flexible, for example, in the case of more than one socket or, respectively, more than one rod per fastener. The sockets also make for a more stable and temperature optimized transition to the rods, because they provide extra support to the rods when there is an increased bending moment in operation and because they are able to effectively deflect increased temperatures, for example, from the belt. Advantageously, which is achieved by virtue of the above-described design of the fastener is a nearly constant geometrical moment of inertia at least up to the transition area to the rods, thereby increasing robustness and stability of the rod arrangement or, respectively, of the rod belt in operation.

Hereby, in addition to inserting the rods into the respective sockets, it may be provided for the rods to each protrude with their ends into holes in the intermediate area aligned with the insertion openings and a rivet connection being established hereby. This rivet connection affixes the respective rod on the intermediate area in a manner both rotation-proof and in the axial direction. The sockets will then additionally hold the respective rod, provide for a deflection of higher temperatures, and also compensate for bending moments about the transvers axis or, respectively, the longitudinal axis, and for shearing forces.

Preferably, the fastener is manufactured in part or totally in a subtractive or additive manufacturing process, for example, in a milling process or 3D printing process, using metal materials, or a thermoplastic, or a thermosetting polymer. Accordingly, it can be manufactured easily and at low energy cost. However, a design as a single-piece molded part made of a metal material or a thermoplastic or thermosetting polymer is also possible so that further manufacturing steps can be dispensed with. Alternatively, an additional reshaping process may be provided, for example, to bend off the intermediate area and/or to bring the sockets into the desired place relative to the belt. This allows, using the invention, to substitute the heating process of forging the rod ends, as shown in the state of the art, with a less complex, less energy-intensive assembling process.

In all manufacturing processes, the at least one socket of the fastening area may also be designed one-piece with the intermediate area so that, overall, a one-piece fastener is provided and assembling individual components is no longer required. This simplified the manufacturing process.

When the lateral surface of the intermediate area additionally extends in a perpendicular direction, preferably in the manner of a strip or plate, at least two sockets of the fastening area, preferably at least three or more sockets, can be firmly attached to the intermediate area. In this case the sockets may be spaced apart in a transverse direction depending on a pre-determined rod pitch between adjacent rods. This rod pitch will then, preferably, be smaller than a cam pitch between cams on the underside and/or cams on the upper side at the respective belt, allowing for a more flexible design of the rod belt.

Preferably, it is further provided for the insertion opening in the at least one socket to have an inserting diameter,
- which is constant across the insertion depth so that an insertion opening of hollow cylindrical shape is formed for receiving a cylindrical rod end of the insertable rod, or
- which varies across the insertion depth so that, for example, an insertion opening tapering towards the intermediate area is formed for receiving a tapered rod end of the insertable rod.

This way, depending on the requirements and selection of the rod, different rod ends with shape designed correspondingly complementary to the insertion openings ca be received. In addition, further measures may be provided for a secure fixation of the rod in the socket, for example, creating a substance-to-substance bond and/or a frictional connection and/or a positive-locking connection with the socket and/or the intermediate area.

Furthermore, it may be provided for a rod diameter of the received rod outside the socket (in the direction of the screening surface) to correspond to a socket diameter of the at least one socket. Thus, the rod is formed at the end such that it fits into the insertion opening and potentially through holes in the intermediate area (in the case of an additional rivet connection), while outside the socket immediately the impression of the one-piece transition between the two is created. This allows the screening surface to be extended across (almost) the entire width between the two belts or, respectively, the two intermediate areas, and the depositing of dirt is avoided.

Figure 2:
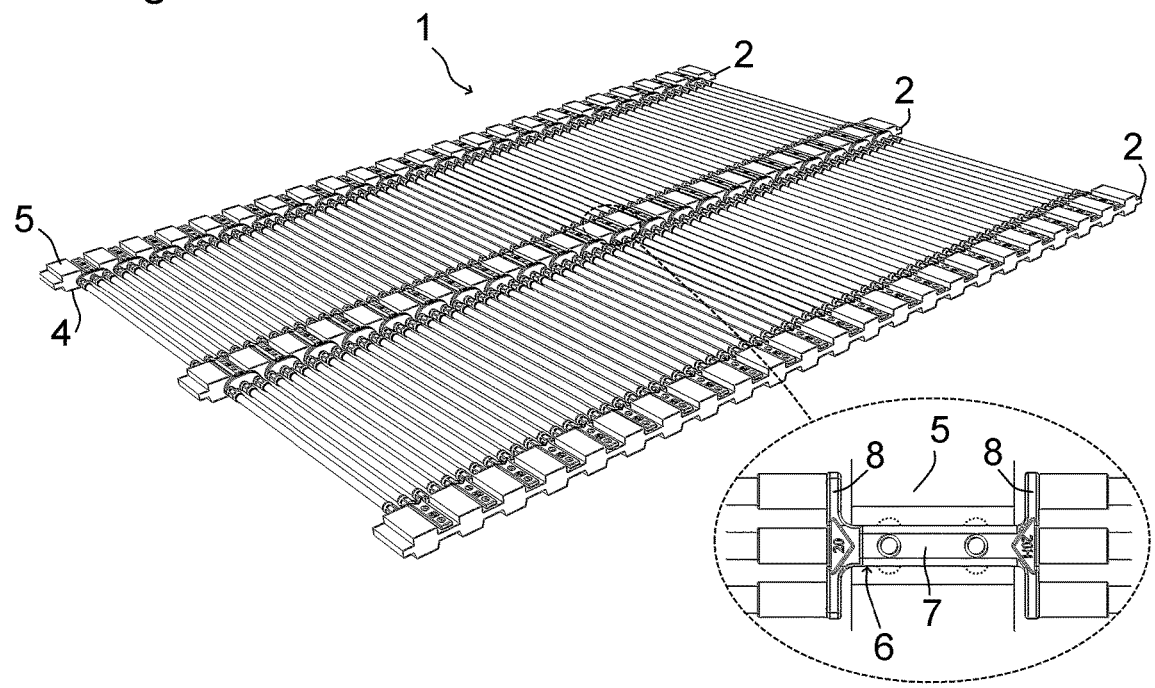
Figure 3:
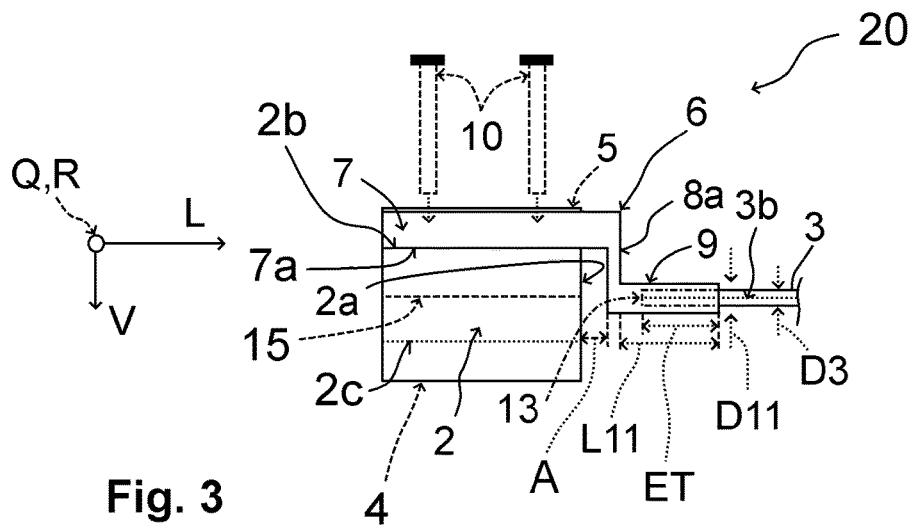
Figure 4:
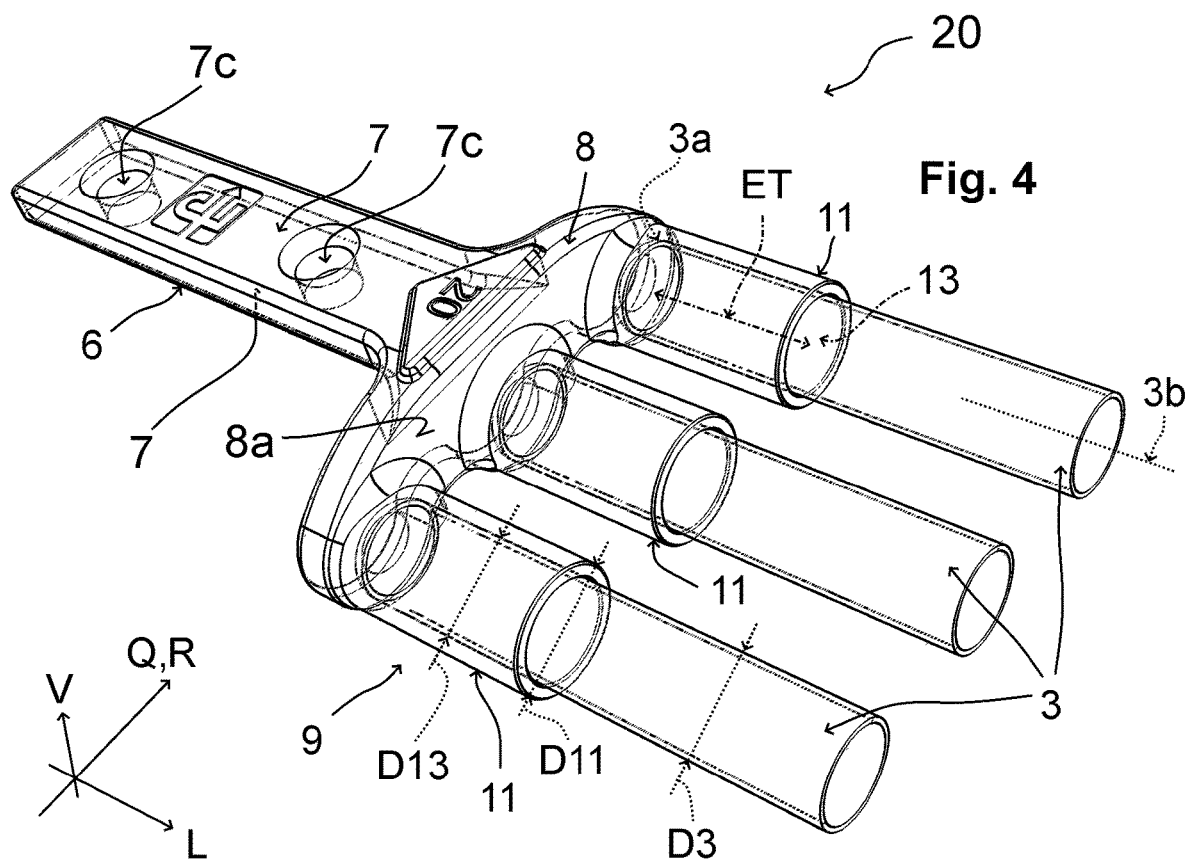
Figure 5:
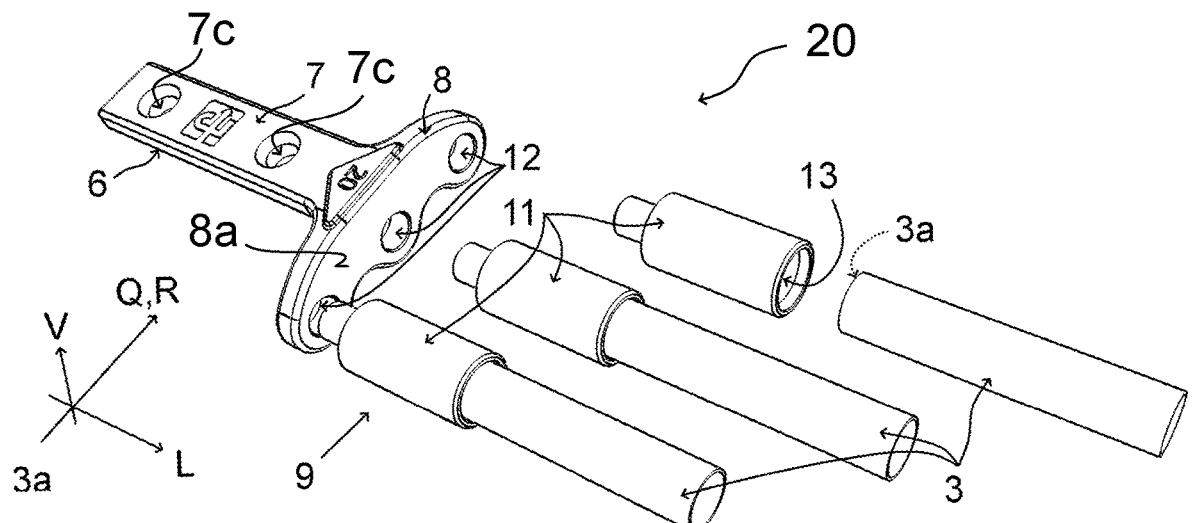
Figure 6:
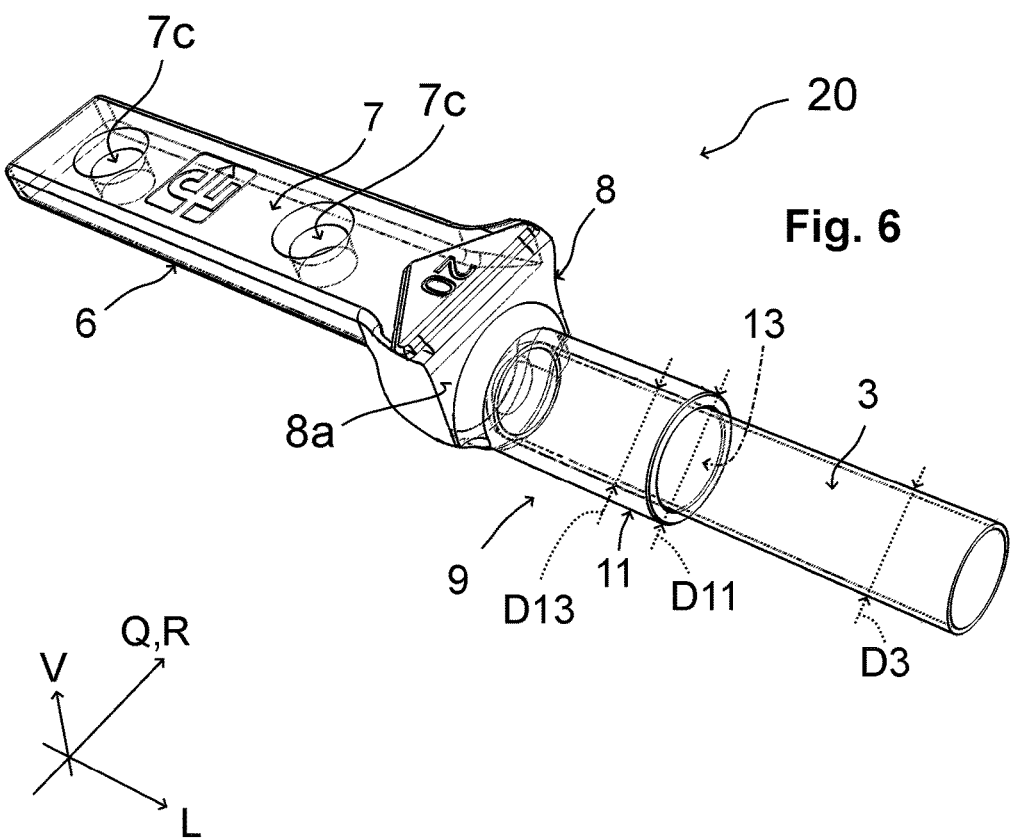
Figure 8A:
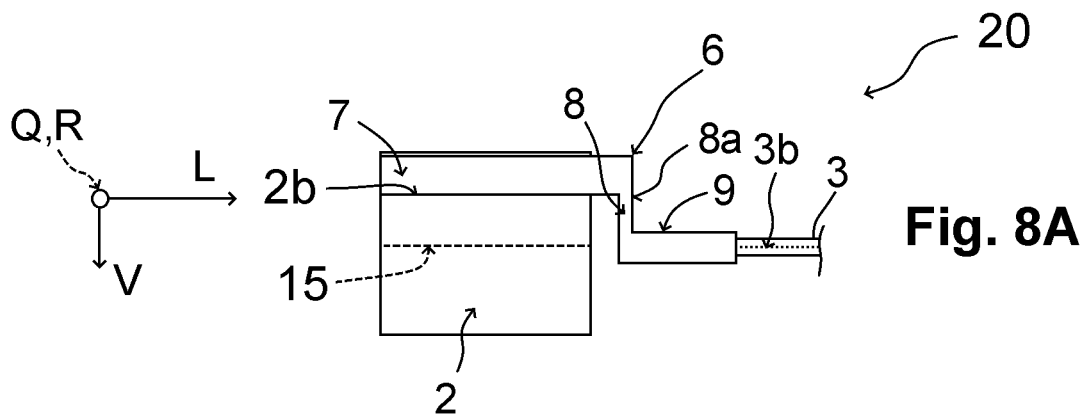
Figure 8B:
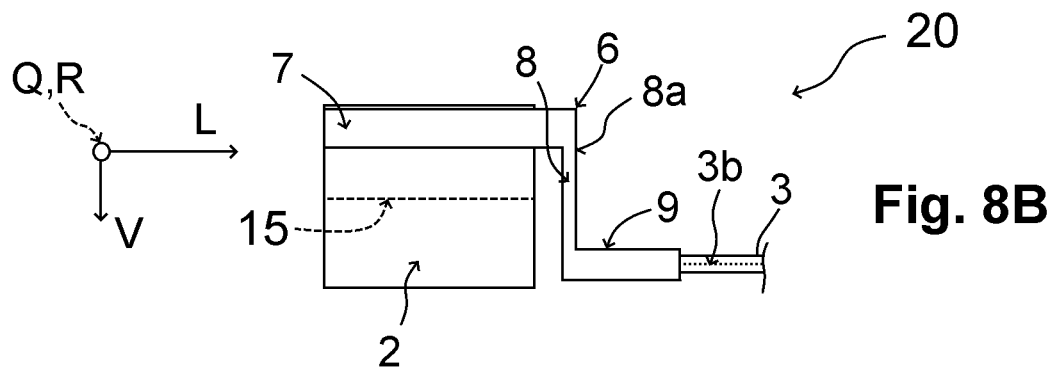
Figure 9A:
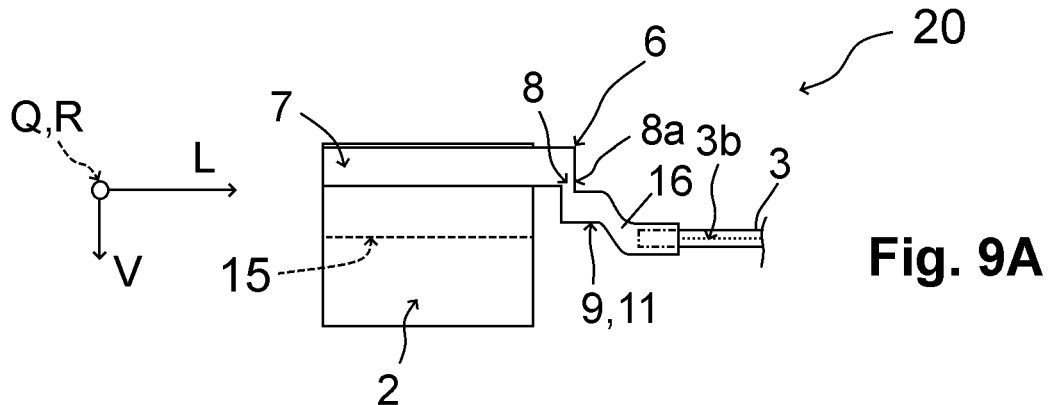
Figure 9B:
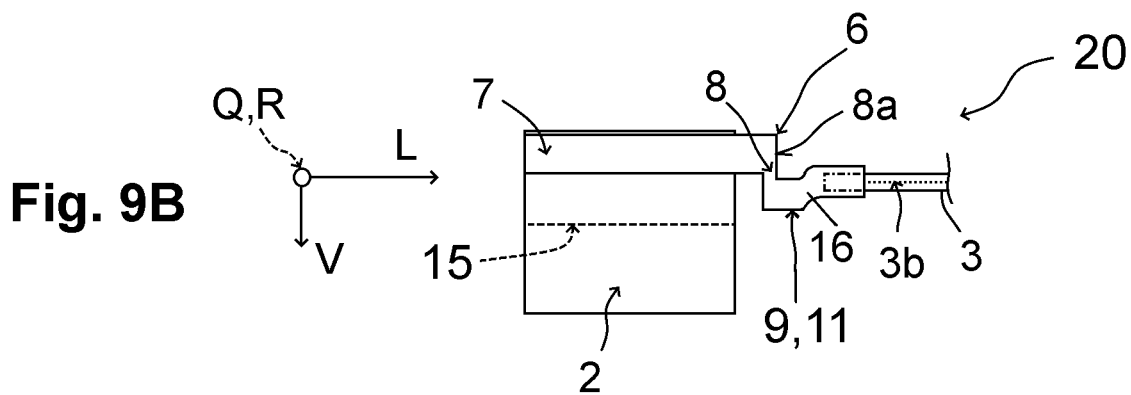
Figure 9C:
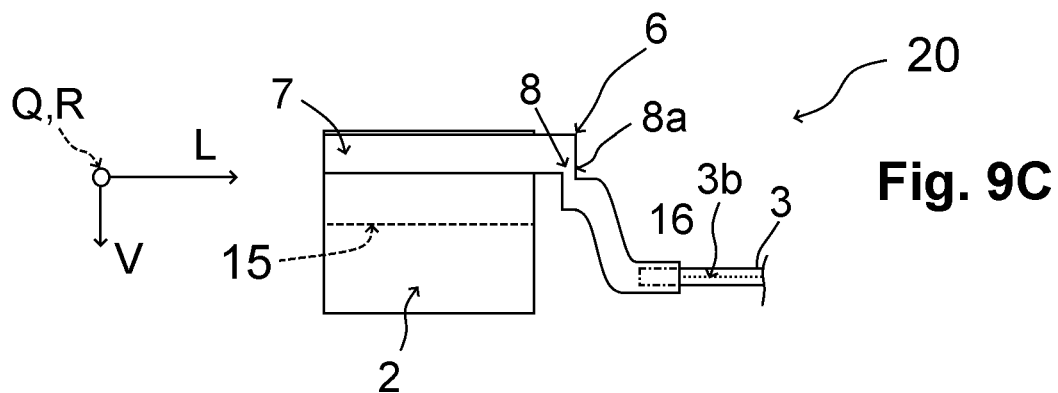
Figure 10:
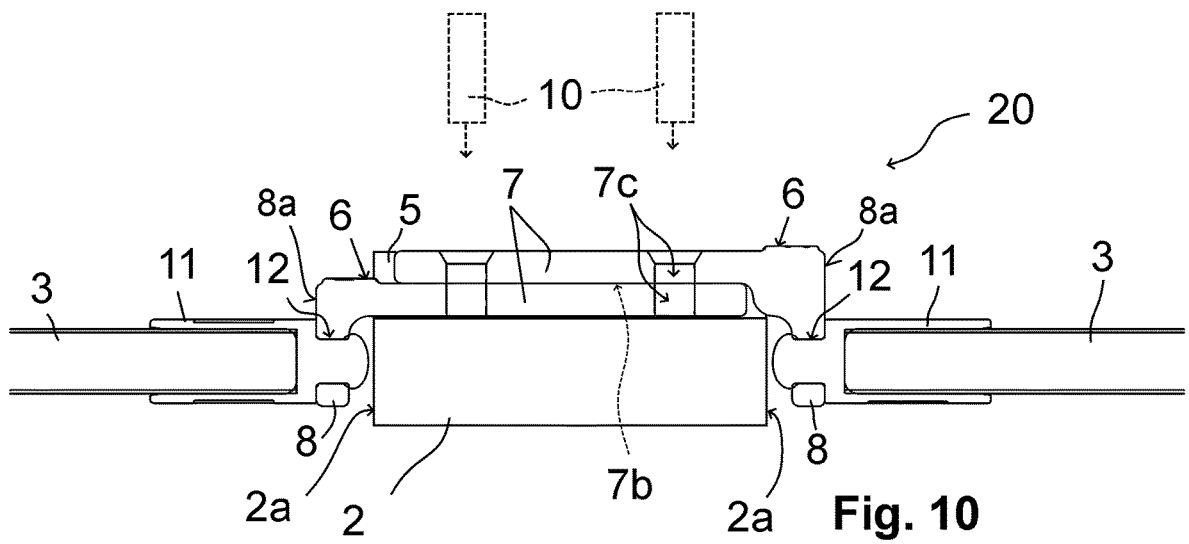
Figure 10A:
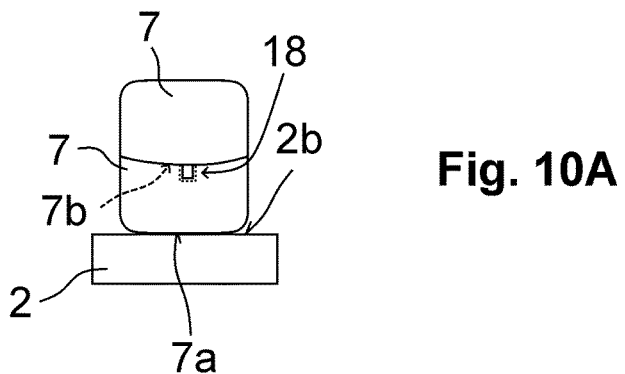
Figure 10B:
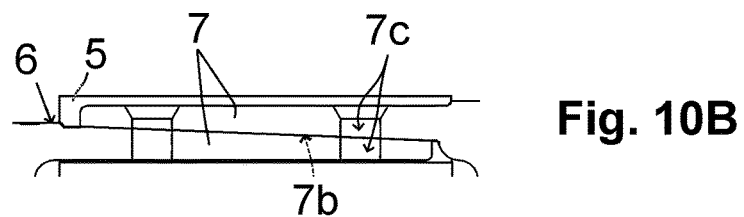
Figure 10C:
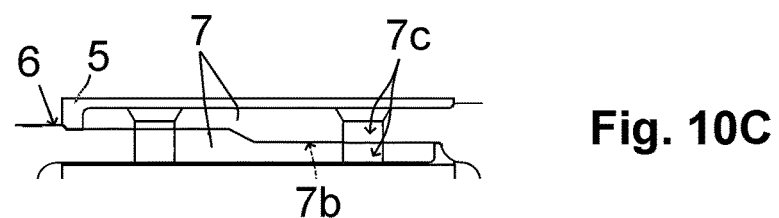
Figure 11A:
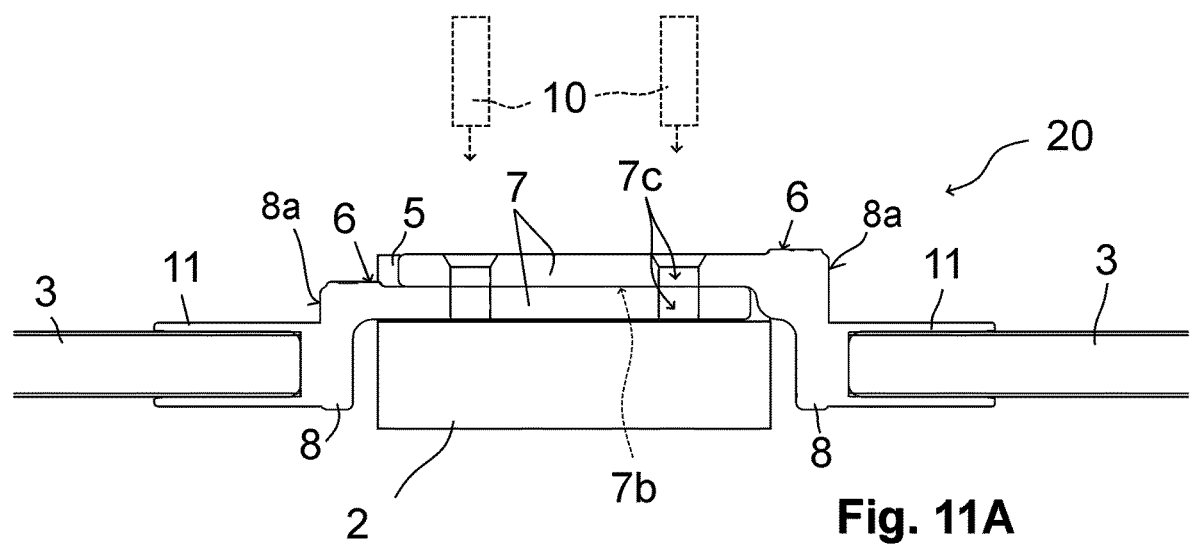
Figure 11B:
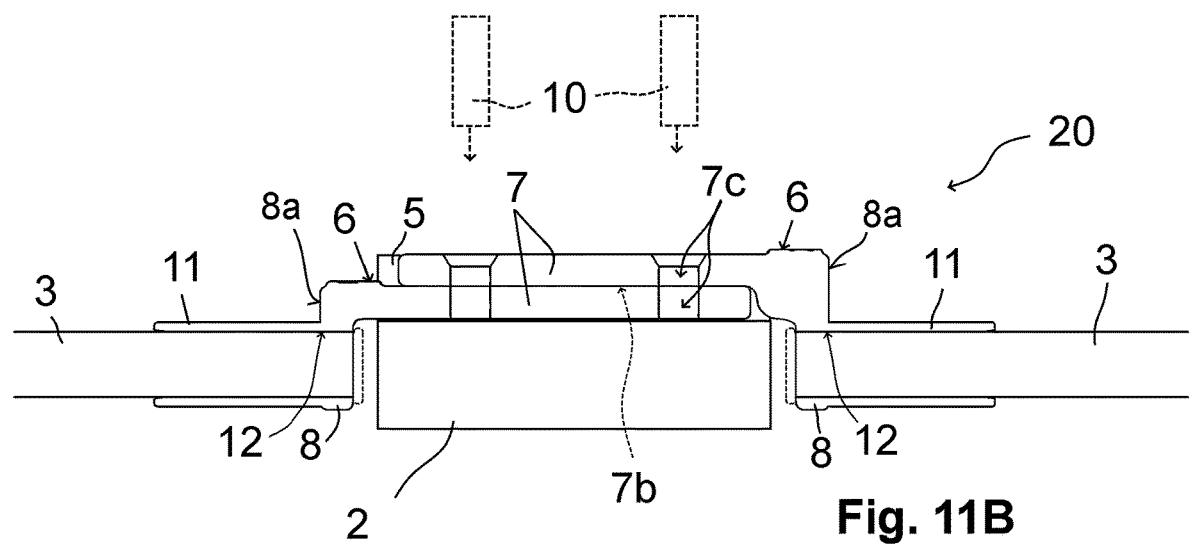

The invention is further illustrated by means of embodiment examples. It is shown in:

FIGS. 1, 2 rod belts having a plurality of rods extending perpendicular to the transport direction;

FIG. 3 a schematic view of a rod with a fastener;

FIG. 4 a first embodiment of the fastener for receiving three rods;

FIG. 5 a second embodiment of the fastener for receiving three rods;

FIG. 6 a third embodiment of the fastener for receiving a rod;

FIGS. 7A-7E further embodiments of the transition between a rod end of the rod and the fastener;

FIGS. 8A, 8B fasteners for various installation positions of the rods according to a first variant;

FIGS. 9A, 9B, 9C fasteners for various installation positions of the rods according to a second variant;

FIG. 10 fasteners on an inner belt of the rod belt;

FIGS. 10A, 10B, 10C various embodiments of the fasteners according to FIG. 10; and FIGS. 11A, 11B further embodiments of fasteners on an inner belt of the rod belt.

FIG. 1 shows a rod belt 1 made of two fabric layer reinforced belts 2 running parallel to one another, and running between them are a plurality of rods 3. In FIG. 2 shows an embodiment of the rod belt 1 in which, additionally, a middle or inner belt 2 runs in a middle region of the rod belt 1. The belts 2 are each designed as cam belts with a plurality of cams 4 on the underside and diametrically opposed cams 5 on the upper side, each spaced apart from one another at a pre-determined cam pitch TN.

The cams 4 on the underside serve to drive the rod belt 1 in a direction of movement R. To that end, drive means of drive wheels, not shown, engage with the gaps between the cams 4 on the underside. The cams 4 on the upper side serve to protect the fasteners 6 attached to the belt 2, a support side 7a of which lies in contact with a belt upper side 2b between the cams 5 on the upper side in a flat, preferably cuboid support area 7. Rod belt 1 designs of this type are known in the state of the art and will require no further illustration.

For the purpose of attaching the individual rods 3 to the respective belt 2 the fasteners 6 are provided which include, as schematically depicted in FIG. 3, a support area 7 extending in a longitudinal direction L (in relation to the fastener 6 or the rods 3), an intermediate area 8 running in an angled direction or, respectively in the vertical direction V in relation to the support area 7, and a fastening area 9. The support area 7, which is preferably designed flat so as not to project beyond the upper side cams 5, serves to apply and affix the respective fastener 6 onto a belt upper side 2b of the respective belt 2. Hereby, the attachment is made by means of fastening means 10, for example, rivets, or similar, running through or penetrating both the support area 7 through a perforation and the belt 2. Hereby, the support area 7 may be widened in a transverse direction Q or, respectively, direction of movement R in the region of the perforation 7c, as indicated by the dotted line in the sections in FIG. 1 and FIG. 2 by way of example. Hereby, it will be achieved that the support area 7 is not weakened in the region of the perforation 7c so that there will be a nearly constant geometrical moment of inertia at least across area support area 7. Owing to the design of the fasteners 6 described below, such a nearly constant geometrical moment of inertia can also be maintained at least up to the transition area to the rods 3.

The support area 7 transitions as one piece into the intermediate area 8 which is angled off downwards in the vertical direction V in the direction of a belt underside 2c. Hereby, the intermediate area 8 is designed non-circular or, respectively, it is fitted onto the support area 7 eccentrically or of-center in relation to a longitudinal axis thereof. For the fastener 6 on the outer belts 2, according to FIG. 1 or 2, the support area 7 transitions into the intermediate area 8 only on one side because only a one-sided attachment of the rods 3 is provided. In this embodiment, for the fastener 6 on the inner belts 2, according to FIG. 2, an intermediate area 8 is provided on both sides of the support area 7 which is connected thereto as one piece.

The respective intermediate area 8 extends in the vertical direction V, essentially perpendicular to the support area 7 so it is aligned in parallel to a belt outside 2a. A lateral surface 8a of the intermediate area 8 faces, starting from the support area 7, consistently in longitudinal direction L or, respectively, this lateral surface 8a runs essentially perpendicular to the longitudinal direction L. Hereby, the lateral surface 8a is assumed to be essentially level.

Hereby, a distance A between the intermediate area 8 and the belt outside 2a is preferably smaller than 10 mm, thereby optimizing the screening surface on the rod belt 1. The intermediate area 8 may, for example, even be in direct contact with the belt outside 2a (A≈0) so as a maximize the screening surface. Moreover, depending on the number of rods 3 per fastener 6 the respective intermediate area 8 with its lateral surface 8a will extend, in the manner of a strip, perpendicular to the support area 7 or to the rods 3 respectively, i.e., in a transverse direction Q or, respectively, in the direction of movement R of the respective belt 2.

The fastening area 9 joining thereto may have various designs. As shown in FIGS. 4 and 5, the fastening area 9 is formed by a plurality of cylindrical sleeves or sockets 11 each being connected to the intermediate area 8. Hereby, the sockets 11 project away from the lateral surface 8a perpendicularly in the longitudinal direction L. This means that the sockets 11 and the flat support area 7 run parallel to one another in the longitudinal direction L and project away from the intermediate area 8 in opposite directions.

The sockets 11 are preferably made one-piece with the intermediate area 8 and the support area 7 so that, overall, a one-piece fastener 6 is provided. To that end, the fastener 6 may, for example, be formed in a subtractive or additive manufacturing process, for example, in a milling process or 3D printing process or similar, using metal materials or thermoplastic, or thermosetting polymers. Furthermore, a molding process may be provided, using the same materials, to provide the fastener as a metal molded part. In this embodiment, only one manufacturing step is required thereby overall simplifying the manufacturing process. Moreover, the heating process of forging the rod ends may be dispensed with in favor of an altogether less complex, less energy-intensive assembling process.

Also, as represented in FIG. 5 in an exploded view, the sockets 11 may be inserted or introduced respectively into holes 12 in the intermediate area 8 and subsequently be connected with the intermediate area 8 in a further connecting process, for example, in a riveting process, screwing process, bonding process, welding process, soldering process, etc. Thus, it is also possible to provide a substance-to-substance bond and/or a frictional connection and/or a positive-locking connection between the intermediate area 8 and the sockets 11. In this case, only the support area 7 with the intermediate area 8 will be manufactured one-piece in one of the aforementioned manufacturing processes.

The fastening area 9 with the sockets 11 serves to receive one or more rods 3, depending on how many rods 3 per fastener 6 are to be secured, which will depend on the use of the rod belt 1. Accordingly, rod arrangements 20 with merely a single rod 3 (single rod, see FIG. 6), two rods 3 (twin-rod, not shown), three rods 3 (triple-rod, see FIGS. 1 through 5) or even more than three rods 3 per fastener 6 may be provided, each rod 3 being held via a single socket 11 on the intermediate area 8 of the fastener 6 and, emanating from there, extending in the longitudinal direction L. However, it may also be provided that a plurality of such sockets 11 are combined to a whole socket (not shown) and the whole socket affixed to the intermediate area 8. Then, in this whole socket, a plurality of rods 3 can be received spaced apart from one another in a transverse direction Q (each via insertion openings 13 spaced apart in a transverse direction Q).

In the case of two or more rods 3 the intermediate area 8 which forms the transition between the support area 7 and the fastening area 9 is extended with its lateral surface 8a in the transverse direction Q or, respectively in the direction of movement R of the belt 2 across a large area in the manner of a strip or plate so as to be able to hold a plurality of sockets 11 side by side in a transverse direction Q and spaced apart (or a larger whole socket). In the case of only a single rod 3, however, the intermediate area 8 with its lateral surface 8a exhibits an expansion in a transverse direction Q which, for example, approximately corresponds to a socket diameter D11 (outer diameter) of the socket 11 (or a little wider), as shown in FIG. 6 by way of example.

Consequently, it is possible to determine a rod pitch TS via the constructional design of the strip-type intermediate area 8 and the fastening are 9. When such a fastener 6 receives two or more rods 3, it is possible to attain a rod pitch TS between the individual rods 3 that is smaller than the cam pitch TN between the individual cams 4,5 on the upper side on the upper side (and on the lower side) (see FIGS. 1, 2). When there is only one rod 3 per fastener 6, however, the rod pitch TS corresponds to the cam pitch TN of the belt 2.

By using a socket 11 in the fastening area 9 it is possible to optimize the transition to the rods 3, resulting in a variety of advantages, depending on the design of the rods 3 and the sockets 11:

For one thing, the attachment of the rods 3 can be optimized. Compared to a fixation only on the intermediate area 8 (as in the state of the art) a socket 11 (or whole socket) projecting away from the intermediate area 8 in the longitudinal direction L provides a more robust or, respectively more stable reception and, therewith a more optimum fixation in the event of occurring bending moments, in particular, in the case of a socket length L11 of, for example, between 5 mm and 30 mm, preferably 15 mm. The end side of the rod 3 can be inserted into such a socket 11 in an insertion opening 13 contained therein up to an insertion depth ET. Hereby, the insertion depth ET corresponds to at least one half, preferably at least two thirds, of the socket length L11, i.e., at least 2.5 mm, preferably at least 7.5 mm or more.

Figure 7A:
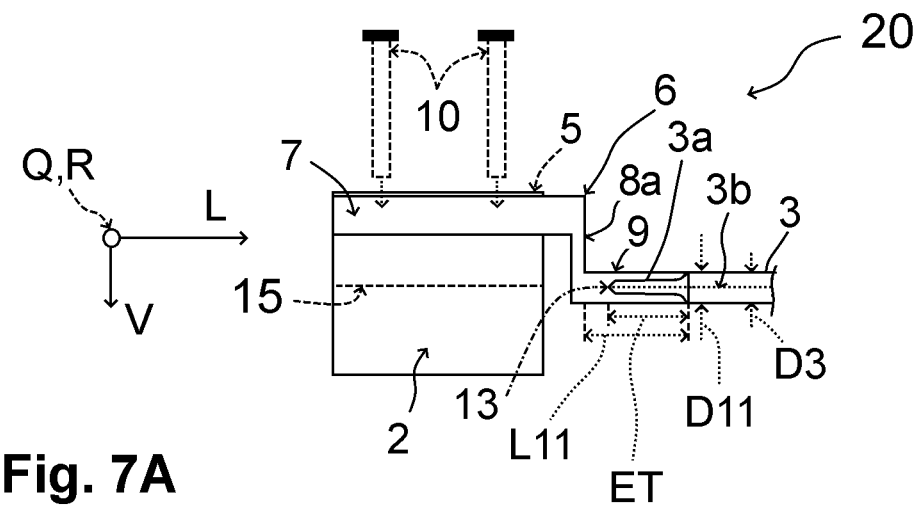
Figure 7B:
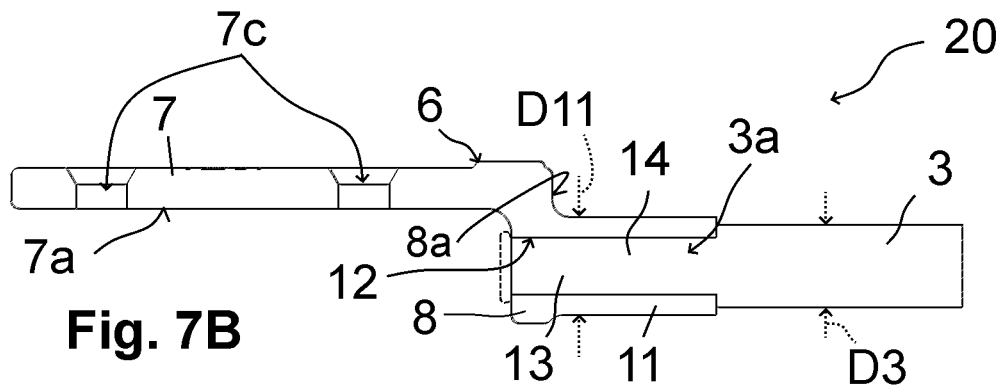

Hereby, the rods 3 may also additionally protrude with such a socket 11 at the end side into holes 12 in the intermediate area 8 and be additionally affixed to the intermediate area 8 by virtue thereof, for example, by means of a rivet connection or similar, as indicated by the dotted line in FIG. 7B. This additionally serves to attach the respective rod Stab 3 on the angled-off intermediate area 8 in a manner axial fixed and/or rotation-proof. The socket 11 then additionally guarantees that the bending moments acting on the rods 3 are efficiently deflected and thereby securing the long-term attachment.

Preferably, the inserted rod 3 is additionally fastened in the insertion opening 13 of the socket 11, in particular, when no additional fixation on the intermediate area 8 is provided. The attachment in the socket 11 is made, for example, by clamping or grouting respectively or, respectively shrinking, bonding, welding, or similar. It is also possible to screw in the rod 3, where the insertion opening 13 will then have a corresponding interior thread for this purpose.

Furthermore, such a socket 11 allows optimization of the temperature transfer between the rods 3 and the fastener 6 or the belt 2, because the sockets 11 can efficiently absorb and deflect higher temperatures so that the rods 3 inserted therein heat up less thereby being thermally stressed to a lesser extent. This may affect the material selected for the rods 3, where, for example, glass fiber or plastics may be used as material to save weight. In principle, however, steel may be used also.

Moreover, by virtue of such a socket 11 the transition between the fastener 6 and the respective rod 3 may be designed more variable in that the socket 11 is made correspondingly specific to the application. Thus, as described already, the insertion depth ET or the socket length L11 respectively may be pre-determined depending on the application so as to attain a desired stability or robustness of the transition. Furthermore, even the shape of the insertion opening 13 may be adapted to the desired shape of the rod 3 or the rod Stab end 3a respectively.

In the simplest case the socket 11 may be a hollow cylinder in shape, as shown in FIG. 4, 5 or 6, so that the insertion opening 13 exhibits an insertion diameter D13 consistent across its length. Hereby, the insertion diameter D13 approximately corresponds to the rod D3 of the rod 3 or, respectively, this is only slightly wider, so as to attain frictional connection between them already on insertion. In this embodiment, the respective rod 3 exhibiting, for example, a rod diameter D3 between 5 mm and 18 mm will no longer require an adaptation at the end side to be affixed on the socket 11 via the insertion opening 13, and this minimizes manufacturing cost.

As shown in FIG. 7A in a sectional view, however, the insertion opening 13 in the socket 11 may have a different shape with an insertion diameter D13 varying across the length, for example, tapered towards the intermediate area 8. In this embodiment, the rod 3 must be "sharpened" at its rod end 3a in a manner correspondingly complementary thereto so that the rod diameter D3 in the region to be inserted decreases accordingly towards the end face. Other shapes of the insertion opening 13 and complementary shapes of the rod end 3a are also possible, for example, a cylindrical pin 14 at the rod end 3a, as shown, e.g., in FIG. 7B or 7C. This cylindrical pin 14 may, as indicated by a dotted line in FIG. 7B, also protrude right into holes 12 in the intermediate area 8, to then be used to create a rivet connection on the end side, via which the respective 3 is affixed to the angled-off intermediate area 8 axially and rotation-proof.

Figure 7C:
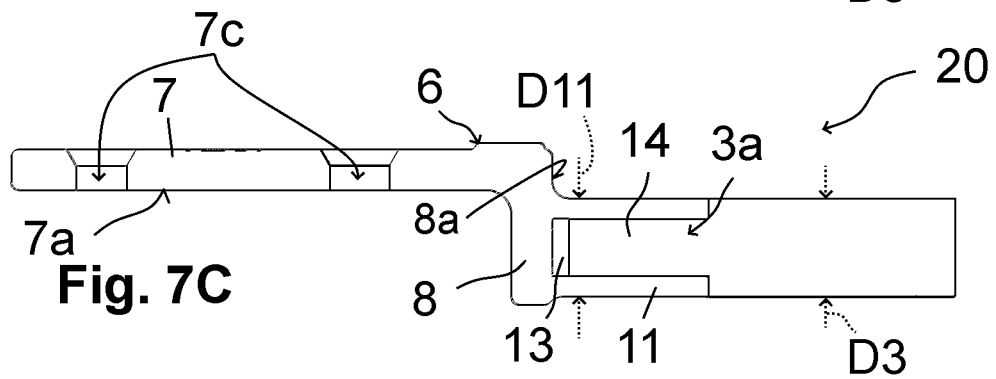
Figure 7D:
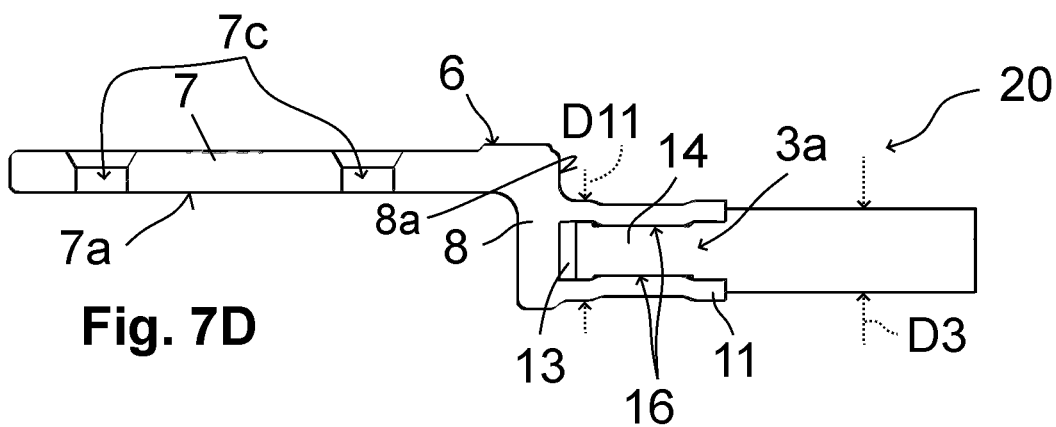
Figure 7E:
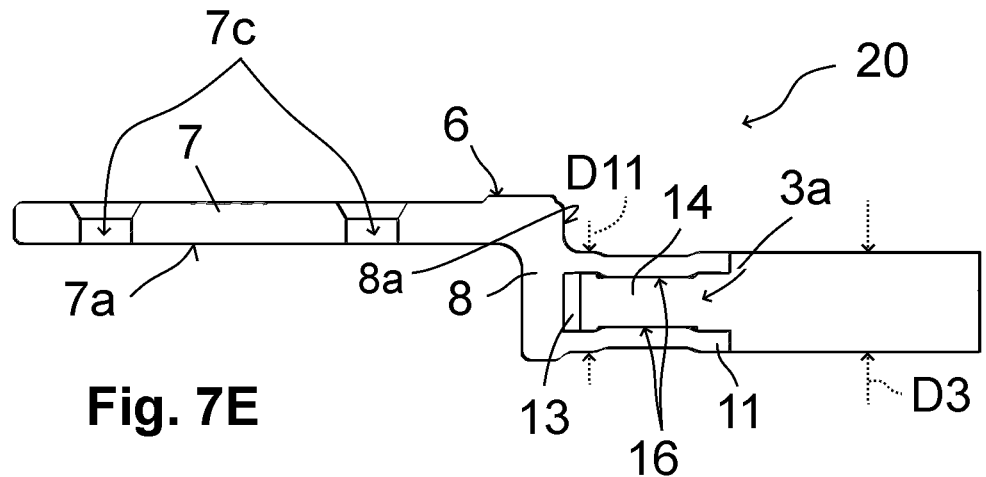

To allow for a secure fixation of the rod 3 in the socket 11, additionally, a recess 16 may be formed in the cylindrical pin 14 at the rod end 3a, as shown in FIGS. 7D and 7E. By appropriate deforming the wall of the socket 11 can be brought to engagement in this recess 16 so as to hold the rod 3 on the socket 11 in the axial direction and possibly even rotation-proof.

In FIGS. 7A, 7C and 7E it is additionally provided that the socket diameter D11 if the socket 11 corresponds to the rod diameter D3 of the rod 3 in the area outside the insertion opening 13. This makes the rod 3 directly merge into the socket 11 so that on the surface no edges or steps are created between the rod 3 and the fastener 6 on which dirt or similar may be deposited in operation of the rod belt 1. This also creates the impression of the fastener 6 being one-piece with the respective rod 3.

The above-described construction of the fastener 6 further allows, in a simple manner, a fixation of the installation position of the rods 3 or the plane respectively, in which the rods 3 are positioned on the finished rod belt 1. Hereby, it is provided that the intermediate area 8 is angled downwards from the support area 7 so that the sockets 11 arranged thereon lie in a plane below the support area 7, as shown in the FIGS. 8A, 8B by way of example. Thereby, the rods 3 received in the sockets 11 are positioned on the rod belt 1 in a plane lying below the belt upper side 2b.

According to FIG. 8A the intermediate area 8 extends in the vertical direction V, for example, so far down in the direction of the belt underside 2c that the socket (n) 11 in the fastening area 9 and therewith also the longitudinal axes 3b of the respective rods 3 lie in the plane of the neutral fiber 15 of the belt 2. According to FIG. 8B the intermediate area 8 extends from the support area 7 downwards in the vertical direction V in such a way that the socket (n) 11 or, respectively, the longitudinal axis (axes) 3*b* of the rod or rods 3 lie in a plane below the neutral fiber 15 of the belt 2.

Another or a further option of determining the installation position or, respectively, the plane of the rods 3 on the rod belt 1 is to deform or, respectively, offset the socket(s) 11 starting from the intermediate area 8, as shown in the FIGS. 9A, 9B, 9C by way of example. Hereby, the socket 11 still projects away from the intermediate area 8 or, respectively, from the lateral surface 8*a* perpendicularly in longitudinal direction L, but then changes its direction to then point in the longitudinal direction L again at the end. Thus, the intermediate area 8 can always be identically angled downwards and the shape of the deformation or, respectively, offset 17 is selected such that the longitudinal axis 3*b* of a rod 3 inserted in the deformed or, respectively, offset socket 11 lies in the plane of the neutral fiber 15 of the belt 2 (s. FIG. 9A) or above (see FIG. 9B) or below it (see FIG. 9C). By the way, this may also be combined with a correspondingly adapted extension and positioning of the intermediate area 8, for example, according to the embodiments of FIGS. 8A, 8B.

Hereby, the embodiments in FIGS. 8A, 8B and 9A, 9B, 9C bear the advantage that always the same rod 3 can be used for each installation position and, therefore, no adaptation or deformation of the rod 3 itself is required. This reduces manufacturing cost because the fastener 6 can usually be manufactured more easily than the rods 3. In principle, however, a deformed or offset rod 3 may be used instead to determine the respective installation position on the rod belt 1.

According to FIG. 10, a further embodiment for the attachment of the rods 3 onto an inner belt 2 is shown. In the FIG. 2 described previously, it is provided that the support area 7 transitional one-piece into an intermediate area 8 on both belt outer sides 2*a* of the inner belt 2. This allows the rods 3 to be held securely in the respective installation position via the sockets 11 on both sides of the inner belt 2, where in the area of the inner belt 2 there usually are higher bending moments which can be sufficiently deflected via the sockets 11. In this variant of the fasteners 6 the design embodiments mentioned above will be utilized also.

In the modified embodiment according to FIG. 10, the support areas 7 of two fasteners 6, each having only a single intermediate area 8, are placed on top of one another in a manner twisted about the vertical axis and jointly attached to the inner belt 2 by means of appropriate fastening means 10, for example, rivets or similar. Hereby, the fastening means 10 push through or penetrate the two perforated support areas 7 and also the inner belt 2.

Hereby, the two fasteners 6 are placed on top of one another in such a way that an intermediate area 8 is arranged parallel to each of the belt outsides 2*a* of the inner belt 2, via which the rods 3 can be attached via the sockets 11 on both sides of the inner belt 2. Thus, two of the above-described fasteners 6 are combined. For the purpose of attaining an approximately identical installation position of the rods 3 on both sides of the inner belt 2 or, respectively, approximately aligned longitudinal axes 3*b* of the rods 3, the intermediate area 8 with the lateral surfaces 8*a* of the fastener 6 lying on top exhibits a wider extension in the vertical direction V than the intermediate area 8 of the fastener 6 lying below. This is because the fastener 6 lying on top is displaced in the vertical direction V about the thickness of the support area 7 of the fastener 6 lying below, which, ideally, is compensated by a correspondingly wider vertical extension of the intermediate area 8 or, respectively, the lateral surface 8*a* of the fastener 6 lying on top. Hereby, tolerances of, for example, up to 3 mm between the longitudinal axes 3*b* of the rods 3 of opposite orientation are acceptable.

In order to avoid relative movement of the two overlying fasteners 6 in the direction of movement R of the belt 2 and/or in the longitudinal direction L of the fasteners 6 or rods 3 respectively, the surfaces 7*b* of the two support areas 7 facing each other are designed non-planar. Thus, the surfaces 7*b* of the two support areas 7 facing each other may be, for example, as shown in FIG. 10A in a sectional view, arched complementary to one another (concavely/convexly) in the direction of movement L of the belt 2, and/or, as shown in FIG. 10B, conically tapered in the longitudinal direction L, or. as shown in FIG. 10C, graduated. Additionally, force peaks may be quenched via a groove and pin combination 18, shown only in FIG. 10A representative for all cases.

The embodiments shown in FIGS. 10, 10A, 10B, 10C may also be utilized for sockets 11 made one-piece with the intermediate area 8 (see FIG. 11A), rod ends 3*b* riveted onto the intermediate area 8 (see FIG. 11B) and even for other shapes of rod ends 3*a* and sockets 11. Thus, the above-mentioned variants are applicable also to this overlying embodiment.

LIST OF REFERENCE NUMERALS 1 rod belt
2 belt
2*a* outer side of belt
2*b* upper side of belt
2*c* lower side of belt
3 rod
3*a* rod end
3*b* longitudinal axis of the rod 3
4 cam on the underside
5 cam on the upper side
6 fastener
7 support area
7*a* support side
7*b* surfaced facing one another
7*c* perforation
8 intermediate area
8*a* lateral surface
9 fastening area
10 fastening means
11 socket
12 holes
13 insertion opening
14 cylindrical pin
15 neutral fiber of the belt 2
16 recess
17 cranked section
18 groove and pin combination
20 rod arrangement
A distance
D3 rod diameter
D11 socket diameter
D13 insertion diameter
ET insertion depth
L longitudinal direction
L11 socket length
Q transverse direction
R direction of movement
TN cam pitch
TS rod pitch
V vertical direction

The invention claimed is:

1. Fastener (6) for a rod belt (1) for agricultural machines comprising a plurality of rods (3), comprising at least:
    a support area (7) extending in a longitudinal direction (L) having a support side (7a) lying underneath in the vertical direction (V) for placing and affixing the fastener (6) onto a belt upper side (2b) of a belt (2) of the rod belt (1),
    at least one intermediate area (8) made one-piece with the support area (7), and
    a fastening area (9) projecting away from the intermediate area (8) in the longitudinal direction (L), said fastening area (9) being formed by at least one socket (11) having an insertion opening (13) extending in the longitudinal direction (L) across an insertion depth (ET), for inserting a rod end (3a) of the rod (3),
    characterized in that the intermediate area (8) is shaped non-circular in cross-section and/or eccentrically fitted onto the support area (7), and is angled downwards in the vertical direction (V) starting from the support area (7) so that a lateral surface (8a) of the intermediate area (8), which is facing away from the support area (7), faces in the longitudinal direction (L), the socket (11) projecting away from this lateral surface (8a) in the longitudinal direction (L) and the insertion opening (13) in the at least one socket (11) running below the support side (7a) of the support area (7), and
    characterized in that the insertion opening (13) in said at least one socket (11) has an insertion diameter (D13), which is constant across the insertion depth (ET) so so that an insertion opening (13) of hollow cylindrical shape is formed for receiving a cylindrical rod end (3a) of the insertable rod (3), or
    which varies across the insertion depth (ET) so that, for example, an insertion opening (13) tapering towards the intermediate area (8) is formed for receiving a tapered rod end (3a of the insertable rod (3).

2. Fastener (6) according to claim 1, characterized in that the intermediate area (8) is angled downwards in the vertical direction starting from the support area (7) so that the lateral surface (8a) of the intermediate area (8), which is facing away from the support area (7), runs perpendicular to the longitudinal direction (L), and where the socket (11) projects away perpendicularly from this lateral surface (8a).

3. Fastener (6) according to claim 1, characterized in that said at least one socket (11) of the fastening area (9) is made one-piece with the intermediate area (8) so as to form a one-piece fastener (6).

4. Fastener (6) according to claim 1, characterized in that the fastener (6) is manufactured in part or totally in a subtractive or additive manufacturing process, preferably using a metal material or a thermoplastic, or a thermosetting polymer, for example in a milling process or 3D printing process, or as a molded part, preferably from a metal material or a thermoplastic, or a thermosetting polymer.

5. Fastener (6) according to claim 1, characterized in that the lateral surface (8a) of the intermediate area (8), which is facing away from the support area (7), also extends in a transverse direction (Q), preferably in the manner of a strip, and at least two sockets (11), preferably at least three sockets (11), are firmly attached to the intermediate area (8) and project away in the longitudinal direction (L), the sockets (11) being spaced apart from one another in a transverse direction (Q) depending on a pre-determined rod pitch (TS) between the rods (3).

6. Fastener (6) according to claim 1, characterized in that said at least one socket (11) and/or the intermediate area (8) is cranked in the vertical direction (V) so as to determine an installation position of the rods (3).

7. Fastener (6) according to claim 1, characterized in that a socket length (L11) of said at least one socket (11) is between 5 mm and 30 mm and the insertion depth (ET) corresponds to at least half of the socket length (L11).

8. Rod arrangement (20) consisting of a fastener (6) according to one of the above claims and at least one rod (3) received in the insertion opening (13) of said at least one socket (11) of the fastening area (9).

9. Rod arrangement (20) according to claim 8, characterized in that a rod diameter (D3) of the received rod (3) outside the socket (11) corresponds to a socket diameter (D11) of said at least one socket (11).

10. Rod arrangement (20) according to claim 8, characterized in that said at least one rod (3) is held inside said at least one socket (11) by means of a substance-to-substance bond and/or a frictional connection and/or a frictional connection in the insertion depth (ET), where the rod end (3a) of the received rod (3) is shaped complementary to the insertion opening (13), for example, cylindrical or tapered, and/or the insertion opening (13) of said at least one socket (11) is aligned with a hole (12) in the intermediate area (8), and the rod end (3a) of the rod (3) protrudes into the hole (12), as a result of which the rod (3) is affixed to the intermediate area (8) both in the axial direction and rotation-proof, for example, by means of a rivet connection.

11. Rod belt (1) for agricultural machines including at least two pull-resistant elastic and continuous (endless) belts (2) running parallel to one another, extending in a direction of movement (R), and including rods (3) arranged perpendicular to the direction of movement of the rod belt (R) and parallel to one another, running in-between two belts (2) for which purpose they are each received with their two rod ends (3a) in a fastening area (9) each of a fastener (6) connected to the belt (2), in particular, a fastener (6) according to one of the claims 1 through 8, the respective fastener (6) comprising at least:
    one support area (7) extending in a longitudinal direction (L) including a support side (7a) lying underneath in the vertical direction (V), via which the fastener (6) lies in contact with a belt upper side (2b) of one of the belts (2) of the rod belt (1) and is attached thereto,
    at least one intermediate area (8) made one-piece with the support area (7), and
    a fastening area (9) projecting away from the intermediate area (8) in the longitudinal direction (L), the fastening area (9) being formed by at least one socket (11) with an insertion opening (13) extending in the longitudinal direction (L) across an insertion depth (ET), into which a rod end (3a) of one of the rods (3) is inserted,
    characterized in that the intermediate area (8) is shaped non-circular in cross-section and/or eccentrically fitted onto the support area (7) and is angled downwards in the vertical direction (V) starting from the support area (7) and of the belt upper side (2b) so that a lateral surface (8a) of the intermediate area (8), which is facing away from the support area (7) and the belt (2), faces in the longitudinal direction (L), said at least one socket (11) projecting away from this lateral surface (8a) in the longitudinal direction (L), and said insertion opening (13) in said at least one socket (11) and/or the longitudinal axis (3b) of the rod (3) respectively inserted therein extending below the support side (7a) of the support area (7) as well as of the belt upper side (2b) of the belt (2).

12. Rod belt (1) according to claim 11, characterized in that the intermediate area (8) of the fastener (6) is connected to the support area (7) in such a perpendicularly angled manner that the intermediate area (8) runs parallel to a belt outer side (2*a*) of the belt (2) to which the fastener (6) is affixed, where a distance (A) between the belt outer side (2*a*) and the intermediate area (8) is a maximum of 10 mm or the intermediate area (8) contacts the belt outer side (2*a*).

13. Rod belt (1) according to claim 11, characterized in that the intermediate area (8) of the fastener (6) is connected to the support area (7) in such a perpendicularly angled manner that the at least one socket (11) connected thereto and/or a longitudinal axis (3*b*) of the rod (3) received therein lie in the plane of a neutral fiber (15) of the belt (2) or above or below the plane of the neutral fiber (15) of the belt (2), preferably within an area of +/−2 mm about the neutral fiber (15).

14. Rod belt (1) according to claim 11, characterized in that at least two rods (3) are received on a fastener (6) via at least two sockets (11) spaced apart from one another in a transverse direction (Q), where a distance between the sockets (11) is selected depending on a pre-determined rod pitch (TS) between the rods (3) on the rod belt (1), where the rod pitch (TS) is smaller than a cam pitch (TN) between cams (4) on the underside and/or cams (4) on the upper side (4) on the respective belt (2).

\* \* \* \* \*